United States Patent [19]
Muellenberg

[11] 4,260,387
[45] Apr. 7, 1981

[54] DRUM PULLEY

[76] Inventor: Ralph Muellenberg, Im Wiesengrund 6, 4048 Grevenbroich, Fed. Rep. of Germany

[21] Appl. No.: 83,457

[22] Filed: Oct. 10, 1979

[30] Foreign Application Priority Data

Dec. 21, 1978 [DE] Fed. Rep. of Germany ....... 2855204

[51] Int. Cl.³ ............................................. F16H 55/36
[52] U.S. Cl. ............................... 474/903; 308/237 A; 403/374
[58] Field of Search ............................... 474/903, 197; 308/237 A, 236, 18, 20; 403/374, 24, 371, 370, 314; 198/780, 835

[56] References Cited

U.S. PATENT DOCUMENTS

| | | | |
|---|---|---|---|
| 2,102,375 | 12/1937 | Morton | 403/362 |
| 2,736,205 | 2/1956 | Dunne, Jr. | 403/370 |
| 2,749,157 | 6/1956 | Dennison | 403/370 |
| 2,763,158 | 9/1956 | Firth | 403/370 X |
| 2,973,654 | 3/1961 | Ewing | 474/197 |
| 2,998,731 | 9/1961 | Renner | 403/371 |

*Primary Examiner*—C. J. Husar
*Assistant Examiner*—Conrad Berman
*Attorney, Agent, or Firm*—Schwartz, Jeffery, Schwaab, Mack, Blumenthal & Koch

[57] ABSTRACT

A drum pulley arrangement for conveyor installations, comprising at least one drum pulley hub having a central opening and a bearing having a central opening aligned with the hub opening. A drum shaft extends through the hub opening and terminates with an end within the bearing opening. A sleeve surrounds a portion of the drum shaft and extends through the hub opening and bearing opening, the sleeve having an interior opening of a diameter adapted to rest on the drum shaft at least in some region of the shaft end. A tightenable tapered clamping assembly is provided for each drum pulley hub, the assembly serving when tightened to couple the sleeve to the drum shaft and to the hub for transmitting a drive torque from the sleeve to the hub and to the drum shaft.

6 Claims, 3 Drawing Figures

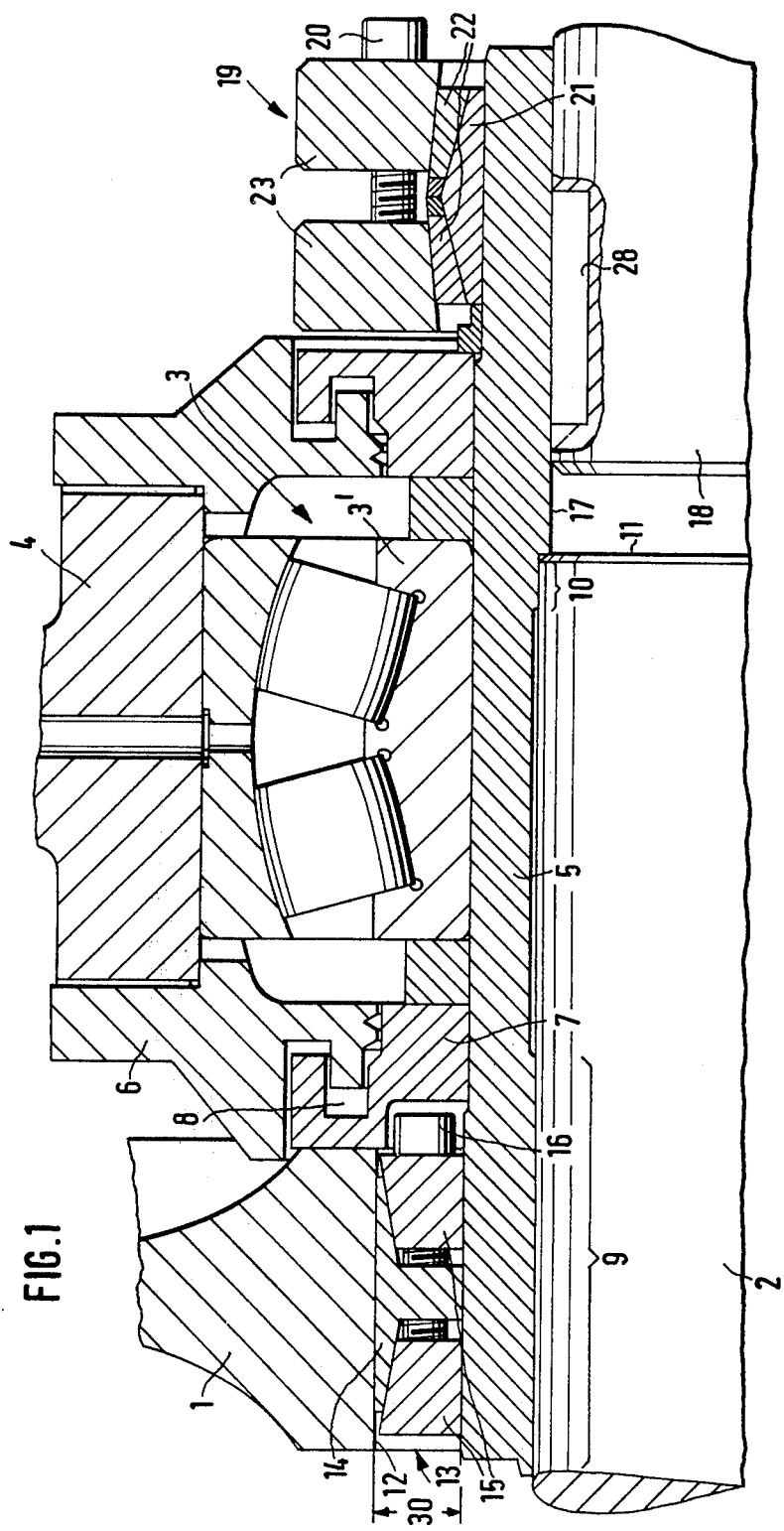

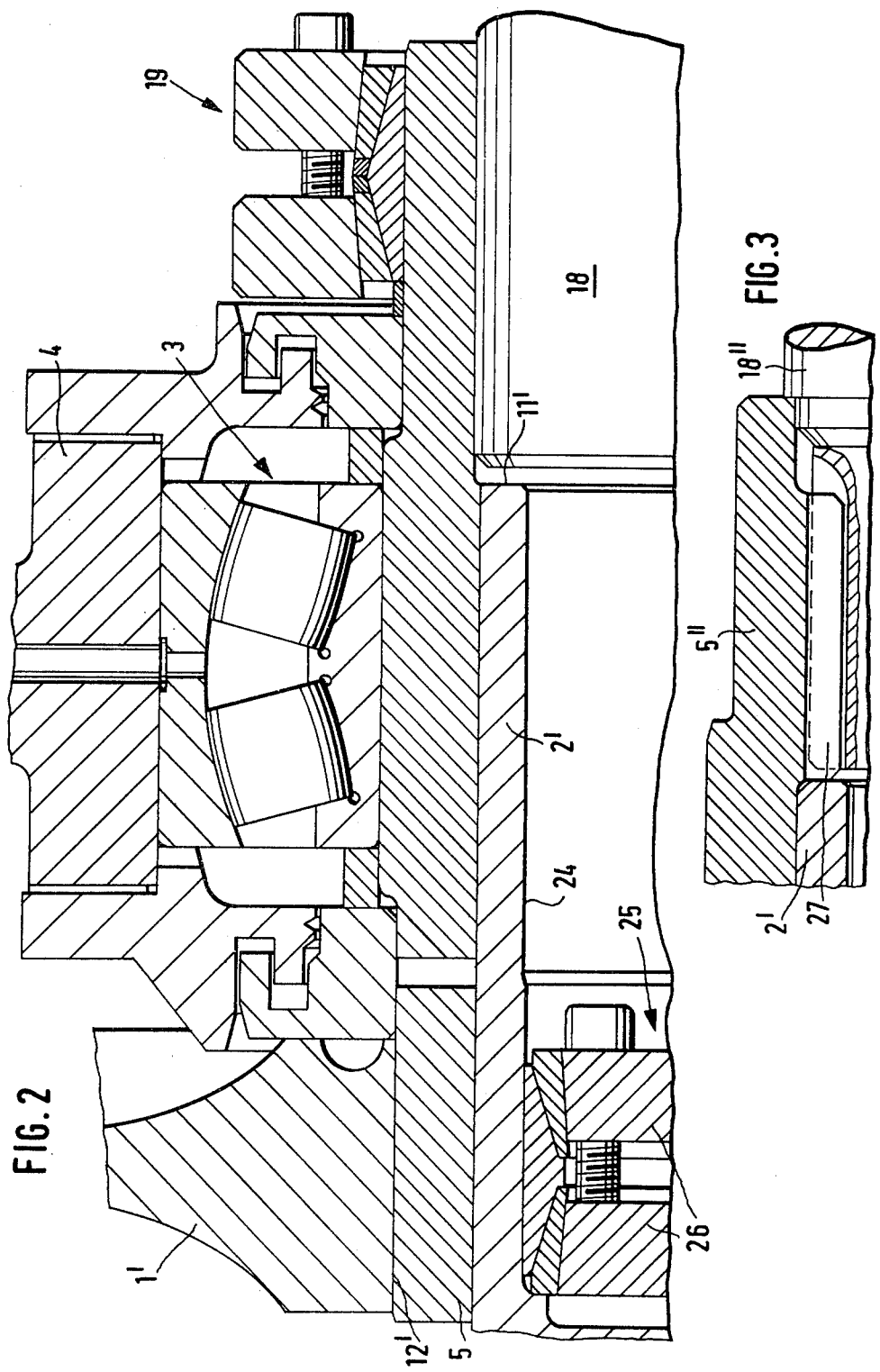

DRUM PULLEY

BACKGROUND OF THE INVENTION

1. Field of the Invention

The invention concerns an improved drum pulley of the general type described in U.S. Pat. No. 2,973,654, in which hub parts are connected by means of tapered clamping assemblies to a drum shaft.

2. The Prior Art

A drum pulley arrangement is known from U.S. Pat. No. 2,973,654, in which a drum pulley is secured to a shaft by means of flanged hubs, the flange of each hub attached to a part of the pulley and the hub parts surrounding the shaft. The external circumference of the hub part is conical, with the heavier wall thickness of the cone being located on the side of the flange. A tapered ring is applied to the external circumference of the hub part and may be tightened against the flange by means of threaded bolts, while resting with its inner circumference on the outer circumference of the hub part. The tightening of the threaded bolts radially compresses the hub part and thus, clamps it fixedly on the shaft.

Drum pulleys of this type are used in considerable sizes. For example, drum pulleys with diameters up to 1,500 mm, lengths to 3 m and shaft diameters to 500 mm are employed in the long conveyors used in lignite coal surface mining. Drives of up to 1000 kW are transmitted by these shafts. Because the shafts of drum pulleys of this size are supported on bearings outside the drum and under certain circumstances must additionally provide space outside the bearings for coupling gears or other means of coupling to the drive, very long and heavy structural parts are involved. The fabrication of such parts entails considerable expense.

Another problem consisted heretofore of the fact that is was necessary to design the shaft with a greater thickness than required by the bending moment acting upon it. Because the drum pulley itself absorbs part of the bending stress generated by the tension of the conveyor belt, the shaft inside the drum pulley is not required to withstand the entire bending moment. The radial forces transmitted by the hubs are introduced immediately next to the outer bearings so that the principal bending stress is applied between the hubs and the bearings. Large shaft diameters are therefore required in this location only. Another reason for the excessive dimensioning of the shaft practiced heretofore is to be found in the self-aligning roller bearings conventionally used to support the shaft. Since the load bearing capacity increases with rising diameters, larger bearings were frequently employed to increase this capacity and the diameter of the shaft adapted to the bearings, while the shaft diameter could have been thinner from the standpoint of the bending moment. Milling to reduce the diameter of the portion of the shaft located inside the drum would merely add to the expense.

SUMMARY OF THE INVENTION

It is an object of the invention to provide a drum pulley of the general type in which hub parts are connected by means of tapered clamping assemblies to a drum shaft, the arrangement designed so that the shaft may have a reduced thickness.

This object is attained according to the invention in that the shaft of the drum extends only to within the bearing and that a bushing sleeve is provided surrounding the end of the drum shaft, abutting at least in the area of the shaft end, and extending through the bearing and capable of transmitting the drive torque. The bushing is adapted to be fastened by means of the tightening of the tapered clamping connection both to the pulley shaft and the hub part.

It is thereby no longer necessary for the pulley shaft to extend beyond the bearing. The connection with the drive shaft may be established on the protruding part of the bushing. The pulley shaft may be designed in the form of a simple cylindrical shaft requiring no keyways or special surface configurations. The diameter of the shaft is given only by the bending moment to be carried over. Depending on the dimensions and the particular design, the bushing is capable of permitting the use of larger bearings. Any machining that may be required will be relatively simple to perform, because the bushing consists of a relatively short piece of tubing.

An important advantage of the transmission of the torque by means of the bushing is, if the latter is of an adequately small wall thickness, its capacity to damp torque impacts by transmitting the impacts in an attenuated form only.

Two forms of the tapered clamping connection are presented.

The sleeve may comprise, according to one form of the invention, a device for axial and external coupling to the journal of a drive gear mechanism. In particular, the sleeve may have an internal diameter outside the bearing corresponding to the journal diameter and the device may comprise a tapered ring clamping set arranged axially outside the bearing on the external circumference of the sleeve and acting in a radially inward direction.

The latter embodiment is particularly advantageous, because it permits coupling to a journal without requiring particular modifications to be made to the journal or the sleeve. No special coupling flanges or the like are required. In addition, power takeoff gears are less expensive by 10 to 20% than the change gears often used heretofore for driving purposes. Connection with the journal is established by tightening the tapered ring clamping set and locking the sleeve on the journal. If, however, the journal is already equipped with keyways, then according to one form of the invention, the device may comprise a spline arrangement secured axially outside the bearing to the sleeve, for the purpose of coupling to the journal. From a manufacturing standpoint, such a keyway arrangement, because of its reduced size, is readily applied to the sleeve.

BRIEF DESCRIPTION OF THE DRAWINGS

FIG. 1 shows a longitudinal section through the bearing and fastening arrangement at the end of the drum shaft of a first embodiment of the invention;

FIG. 2 shows a view similar to FIG. 1 of a second embodiment of the invention; and FIG. 3 shows a modification according to a third embodiment with a spline connection to the journal.

THE PREFERRED EMBODIMENTS

To facilitate understanding of the present invention, U.S. Pat. No. 2,973,654 to EWING is incorporated herein.

Hub 1 in FIG. 1 is located against the right end of the drum pulley, not shown. Drum shaft 2 thus extends to the left through the drum pulley to the hub on that side and to the bearing.

Shaft 2 is supported in a self-aligning roller bearing 3, located in a bearing housing 4. The inner race 3' of self-aligning roller bearing 3 is located on a sleeve 5, extending from hub 1 to within bearing 3 and protruding for a distance to the outside, i.e., toward the end to the right in FIG. 1. The self-aligning roller bearing 3 is protected against the penetration of dirt by bearing cover rings 6, 7, forming a labyrinth with sleeve 5 and bearing housing 4, respectively.

Sleeve 5, in region 9, rests on the shaft within the hub part and, in region 10, rests on the shaft at the right end 11 of the drum shaft 2. Right end 11 of drum shaft 2 is located in this embodiment approximately in line with the right end of self-aligning roller bearing 3.

In a spacing 30 between shaft opening 12 of hub part 1 and the outer circumference of sleeve 5, a tapered ring clamping set 13 is arranged, the clamping set comprising a double tapered ring 14 with a cylindrical extenal circumference fitting within and against shaft opening 12, and two internal conical circumferential surfaces expanding outwardly in opposition to each other. A tapered ring 15 is associated with each of these internal circumferential surfaces, cooperating by means of its conical outer circumference with one of the tapered inner circumferential surfaces of double tapered ring 14 and resting with its cylindrical inner circumference on the external circumference of sleeve 5. By means of threaded locking bolts 16, tapered rings 15 may be tightened against each other, whereby the cylindrical circumferential surfaces of the tapered ring clamping set 13 are driven apart in the radial direction. This results in the clamping of hub part 1 to sleeve 5 and of sleeve 5 to drum shaft 2. In the end of sleeve 5 protruding from the area of the bearing arrangement, inner circumference 17 of the sleeve has a diameter corresponding to that of journal 18 of a drive gear mechanism (not shown). On the external circumference of sleeve 5, a tapered ring clamping set, designed in its entirety at 19, is provided, which upon the tightening of the drawbolts 20, compresses sleeve 5 radially inwardly, thus clamping it to journal 18. Keyways 28 which may be present in the journal 18 are immaterial with respect to the effetiveness of the connection.

Tapered ring clamping set 19 comprises an inner double tapered ring 21 with a cylindrical inner circumferential surface and opposingly inclined taper angles outside the self-locking range. The greatest wall thickness of tapered ring 21 is found in the center. Two tapered rings 22 are seated on tapered ring 21; rings 22 have tapered inner circumferences conforming to the outer circumference of tapered ring 21 and possess a conical external circumference with a taper angle within the self-locking range, whereby the latter taper angle is under the self-locking angle by at least the angular distance by which the taper angle of double tapered ring 21 exceeds the self-locking angle. The preferred arrangement allows for a limiting angle of 7° between the taper access and a taper mantle line. In order to avoid power losses, tapered rings 22 are slit to the vicinity of their mutually facing front sides. Tapered washers 23 are seated on the outer taper surfaces of the tapered rings 22, with washers 23 having inner tapered surfaces conforming to the outer circumferential surfaces of tapered rings 22.

When lockbolts 20 are to be tightened, tapered rings 22 are brought together initially, until they are in contact with each other. From this point, further tensioning of the taper surfaces of the tapered washers 23, which are within the self-locking range, takes place. Substantial clamping forces may be applied in this manner. The tapered washers 23 have a cross section larger than the other tapered rings and naturally are not slit. When lockbolts 20 are released, the clamping set is automaticlly released at the taper surfaces outside the self-locking range.

In the embodiment according to FIG. 2, hub part 1' is seated with its shaft opening 12' directly upon sleeve 5. Drum shaft 2' extends with its right end 11' into the region of the self-aligning roller bearing 3 and exhibits at this end a cylindrial recess 24, which extends to within the opening in hub part 1'. A tapered ring clamping set 25 arranged under hub part 1' in recess 24, clamping set 25 corresponding to tapered ring clamping set 19, but with the exceptions that it acts in the radially outward direction, and that outer tapered washers 23 are replaced by inner tapered washers 26, which serve as supports. During the tightening of the lockbolts, the wall of recess 24 of drum shaft 2' and sleeve 5 are pressed radially in the outward direction against shaft opening 12' and in this manner connected with each other and with the hub part 1'.

The coupling of the journal by means of tapered ring clamping set 19 is in accordance with the embodiment of FIG. 1. However, this type of coupling may be replaced according to the embodiment of FIG. 3 with a conventional splined shaft connection, for which sleeve 5" and the journal 18" have a suitably mating configuration 27.

I claim:

1. A drum pulley arrangement for conveyor installations, comprising:
    at least one drum pulley hub having a central opening;
    a bearing having a central opening aligned with the hub opening;
    a drum shaft extending through the hub opening and terminating with an end within the bearing opening;
    a sleeve surrounding a portion of the drum shaft and extending through the hub opening and bearing opening, the sleeve have an interior opening of a diameter adapted to rest on the drum shaft at least in some region of the shaft end; and
    a tightenable tapered clamping assembly for each drum pulley hub, the assembly serving when tightened to couple the sleeve to the drum shaft and to the hub for transmitting a drive torque from the sleeve to the hub and to the drum shaft.

2. The drum pulley arrangement of claim 1, further comprising an annular space between an interior circumference of the hub opening and an exterior circumference of the sleeve, the tapered clamping assembly comprising a tapered ring clamping set arranged in the space, the tapered ring clamping set acting both radially outwardly and radially inwardly when tightened.

3. The drum pulley arrangement of claim 1, wherein the drum shaft has a coaxial cylindrical recess extending to within the hub opening, the tapered clamping assembly comprising a tapered ring clamping set arranged within the recess in the region of the hub opening and acting radially outwardly when tightened.

4. The drum pulley arrangement of claims 1, 2, or 3, further comprising a journal of a drive mechanism axially aligned with the drum shaft outside the bearing, further including means for coupling the sleeve to the journal for transmitting torque from the journal to the sleeve.

5. The drum pulley arrangement of claim 4, wherein the coupling means comprises a sleeve and portion surrounding an end portion of the journal axially outside the bearing opening, the sleeve end portion having an internal diameter corresponding to the diameter of the journal end portion, and a tightenable, tapered ring clamping set surrounding the sleeve end portion and acting radially inwardly when tightened.

6. The drum pulley arrangement of claim 4, wherein the coupling means comprises a spline arrangement for connecting the sleeve to the journal axially outside the bearing opening.

* * * * *